Sept. 29, 1970  G. KOPP  3,530,959
APPARATUS FOR ARRESTING THE ACCELERATION OF AN AIRCRAFT
Filed Jan. 8, 1968

United States Patent Office 3,530,959
Patented Sept. 29, 1970

3,530,959
APPARATUS FOR ARRESTING THE
ACCELERATION OF AN AIRCRAFT
Gerhard Kopp, Munich, Germany, assignor to
Entwicklungsring Sud G.m.b.H., Munich, Germany
Filed Jan. 8, 1968, Ser. No. 696,408
Claims priority, application Germany, Jan. 13, 1967,
E 33,208
Int. Cl. F16d 63/00
U.S. Cl. 188—1   4 Claims

ABSTRACT OF THE DISCLOSURE

The invention concerns an apparatus for arresting the acceleration of an aircraft and includes an elongated, flexible member such as a rope, one end of which is terminated to form a loop. Helically wrapped about the exterior surface of the rope and secured to the two ends thereof is a safety wire. Upon rupture of the rope, a sudden release of energy is produced tending to cause the broken ends thereof to be rapidly forced toward their respective mounts. The safety wire serves to control the release of energy of the rope ends so as to determine their paths of movement, thereby preventing possible damage to equipment and personnel. With regard to alternate embodiment, the safety wire is essentially disposed within the flexible member.

BACKGROUND OF THE INVENTION

This invention generally relates to a high-strength, flexible member in the form of a rope or cable of steel, hemp, or synthetic resin. Such members are subject to considerable stress and are occasionally stressed up to the breaking limit. In the event of rupture under stress, considerable energy is released causing the broken ends of the rope to abruptly fly in the directions of their respective mounts. Such an occurrence may result in considerable damage to equipment and possible injury to surrounding personnel.

German Pat. No. 822,703 describes a cable including an elastic, rubberized, zigzag-wrapped strand which is thicker than the remaining strands and is included in the braid and subjected to the same stress as the remaining strands. This elastic strand serves to prevent skidding in a longitudinal direction and is not directed toward the problem of controlling the broken ends of the rope in the event of rupture.

German Pat. No. 617,930 describes a flexible shaft which comprises a metal strip wound helically about a rope. This metal strip forms a jacket which subjects the rope to compressive as well as tensional force. Such a device considerably increases the weight of the rope and is relatively expensive to fabricate.

Briefly, the illustrated embodiment includes a safety wire wound around the rope or alternately disposed within the body of the rope. The length of this safety wire is longer than the length of the central member and is not, in normal use, subject to tensional stress.

In the event of rupture, the rope is adapted to control the movement of the ends of the rope. The safety wire serves to control the dissipation of the energy released by the member upon rupture in a gradual manner so as to prevent damage to equipment or injury to personnel.

It is a main object of this invention to provide an improved flight arresting apparatus which avoids the drawbacks of conventional acceleration arrestors by providing high load capabilities and by preventing damage should the load carrying member rupture. Other advantages of the invention will become apparent with reference to the following description of the preferred embodiments of the invention as read in connection with the accompanying drawing.

DESCRIPTION OF THE PREFERRED EMBODIMENTS

Figure 1:
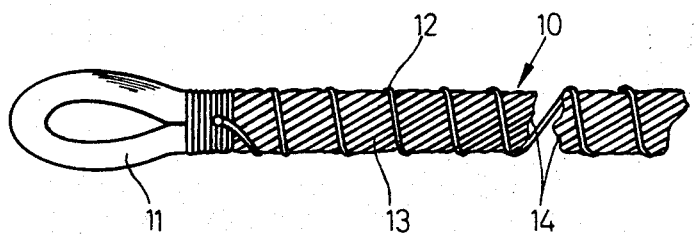
FIG. 1 is a fragmentary view of an arresting apparatus including certain features of this invention.

With particular reference to the embodiment illustrated in FIG. 1, the arresting apparatus includes an elongated member in the form of a rope 10 formed to provide a connecting loop 11 at one end thereof. The remaining end (not shown) may be similarly formed. A safety wire 12 is helically wound around the surface 13 of the rope 10. The rope 10 is preferably wound without producing substantial tension therein and is whipped about the rope adjacent the loop 11. In the event of rupture under stress, the energy released by the torn rope ends 14 is controlled by the safety wire 12 and dissipated in an orderly manner. Should the stress continue after the rope is torn, the safety wire 12 will, of course, stretch and may eventually break. The forces released by the rupture of the safety wire are insignificant, since the wire is of a relatively high gauge.

Figure 2:
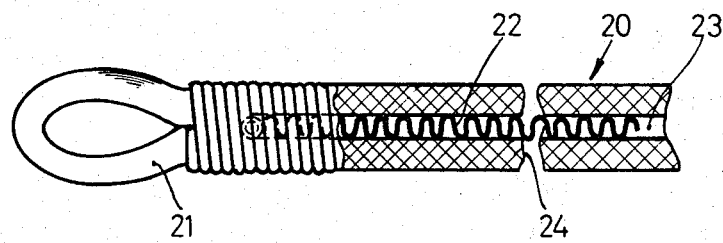
FIG. 2 is a partial, sectional view of an alternate embodiment of an arresting apparatus including certain features of this invention.

Referring to the alternate embodiment of FIG. 2, an arresting apparatus 20 is illustrated which is braided in a manner defining a cylindrical space 23. The space 23 is centrally disposed and extends from a point adjacent a loop 21 to the opposite end of the rope which may also be looped. Disposed within the hollow space 23 is a safety wire 22 formed in a zigzag fashion. The safety wire 22 is connected to the rope adjacent the loop 21 and, during normal use, is not subject to substantial stress. In the event of rupture, energy is dissipated by the rope ends 24 causing them to fly in opposite directions toward their respective mounts. The safety wire 22 is consequently stretched and controls the dissipation of the energy released by the ruptured rope.

Figure 3:
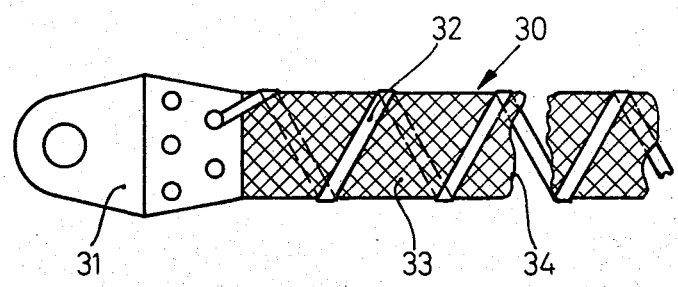
FIG. 3 is a fragmentary view of still another alternate embodiment of an arresting apparatus including certain features of this invention.

Referring to the second alternate embodiment illustrated in FIG. 3, an arresting apparatus 30 is illustrated which includes a mounting fish plate 31. Secured to the fish plate 31 is an elongated flexible member in the form of a generally flat cable 33. Helically wrapped about the surface of the cable 33 is a safety wire 32 in the form of a narrow strap. The ends of the wire 32 are secured to the plate 31, and the remaining end (not shown) of the cable 33 may be provided with a similar fish plate. The safety wire 32 is adapted to control the released energy in the event of rupture of the cable 33 in a manner similar to that described in connection with the previous embodiments.

An arresting apparatus in accordance with the illustrated embodiments provides a convenient means for absorbing the energy release upon rupture of a wide variety of elastic support cables. Such cables are often used as towing cables for cars and various other vehicles. Further, the arresting apparatus according to the invention can be used advantageously to lash an aircraft engine during a test run. In such applications, the energy released by the torn rope ends upon rupture could easily damage various portions of the aircraft engine; for example, the intake orifice.

In certain instances, it may be desirable to construct the safety wire from a plurality of strands having varying thicknesses. A safety wire constructed in such a manner provides a step-by-step or gradual release of energy should it also eventually rupture.

Although various embodiments of the invention have been herein shown and described, it will be understood that certain details of the construction shown may be altered without departing from the spirit and scope of this invention.

What is claimed is:

1. An arresting apparatus particularly adapted for shortening the landing run of aircraft comprising an elongated flexible member, a safety wire secured to each of the ends of said member and having a length greater than the length if said member, said safety wire having less tensile strength than said flexible member.

2. An apparatus in accordance with claim 1 wherein said safety wire is helically wound around the outer surface of said flexible member and is maintained in a generally unstressed condition.

3. An apparatus in accordance with claim 2 wherein said safety wire is comprised of a plurality of strands of wire having various gauges so as to permit a gradual energy release in the event said safety wire ruptures.

4. An apparatus in accordance with claim 1 wherein said elongated flexible member defines a generally centrally disposed hollow chamber and wherein said safety wire is folded in a zigzag manner and disposed with the hollow chamber defined by said elongated flexible member.

References Cited
UNITED STATES PATENTS

| | | | |
|---|---|---|---|
| 3,130,819 | 4/1964 | Marshall | 188—1 |
| 3,217,838 | 11/1965 | Peterson et al. | 188—1 |
| 3,234,723 | 2/1966 | Brown | 57—144 X |
| 3,350,034 | 10/1967 | Madey et al. | 188—1 X |

DUANE A. REGER, Primary Examiner

U.S. Cl. X.R.

57—144; 244—110